Nov. 10, 1970  R. JESINGHAUS ETAL  3,538,765
DEVICE FOR THE DETERMINATION OF TENSILE FORCES OCCURING
IN THIN COLD ROLLED STRIP
Filed Sept. 1, 1967  5 Sheets-Sheet 4

INVENTORS
RUDOLF JESINGHAUS
HORST SCHOLTEN
BY
HENRY C. WESTIN
THEIR ATTORNEY

Nov. 10, 1970  R. JESINGHAUS ETAL  3,538,765
DEVICE FOR THE DETERMINATION OF TENSILE FORCES OCCURING
IN THIN COLD ROLLED STRIP
Filed Sept. 1, 1967  5 Sheets-Sheet 5

INVENTORS
RUDOLF JESINGHAUS
HORST SCHOLTEN
BY
HENRY C. WESTIN
THEIR ATTORNEY

United States Patent Office
3,538,765
Patented Nov. 10, 1970

3,538,765
DEVICE FOR THE DETERMINATION OF TENSILE FORCES OCCURRING IN THIN COLD ROLLED STRIP
Rudolf Jesinghaus, Dahlbruch, and Horst Scholten, Buschhutten, Germany, assignors to Siegener Maschinenbau G.m.b.H., a corporation of Germany
Filed Sept. 1, 1967, Ser. No. 665,092
Claims priority, application Germany, Sept. 3, 1966, S 105,676
Int. Cl. G01l *5/04, 5/08, 5/10*
U.S. Cl. 73—144    8 Claims

ABSTRACT OF THE DISCLOSURE

The present invention relates to a device for determining the tensile forces in a rapidly moving cold rolled strip in a manner that does not require any physical contact between the determining means and the strip. It provides a means for producing an energy field and directing the energy field perpendicular to the strip. Signal transmitters are provided which measure the characteristics of the energy field, which measurements are related in such a way to determine the tensile forces in the strip.

---

Figure 1:
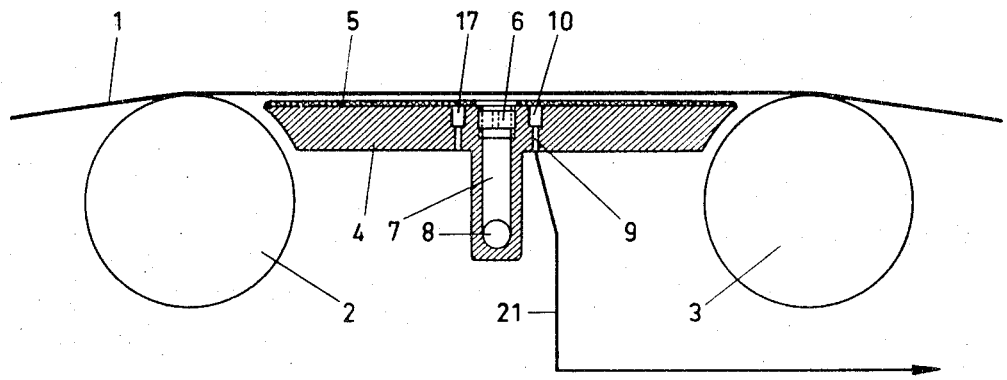

This invention relates to a device for determination of tensile forces in cold rolled strip during the processing thereof.

In an attempt to avoid variations in thickness over the width of a cold rolled strip it has been known to use control devices which aim at a uniform dimension of the roll gap by changing the rolling force. Rolling the strip to a uniform width thickness is required, not only to achieve a product held within small tolerances, but also to avoid greater stretching in the longitudinal direction of the strip which occurs in the thinner section thereof.

It has been known, furthermore, that for the rolling process itself a relatively high tension of the strip proves favorable, that, however, on the other hand the tensile stresses must remain below the ultimate strength of the material. When the strip is non-uniformly rolled across its width, the amount of tension is controlled by the cross section of the thinnest portion of the strip.

For preserving optimal conditions, and in doing so in particular for achieving a uniform thickness remaining so over the width of the strip control devices are used which are controlled by thickness measuring devices which contact the strip in various regions of its width and which transmit the thickness results obtained in their sphere of operation to the control device. This method has been found objectionable in that the feeler levers, feeler rollers, or the like have a tendency to mark the strip which in the further processing of the strip can hardly be removed and which lowers the commercial value of the processed sheets to a considerable extent. There are, therefore, thickness meters that work on the principle of absorbing rays which, although they permit measurement of the thickness of the strip without contact in their evaluation represent a considerable outlay.

Beyond that, measuring devices have been known for regulating the tension of the strip in which the strip is guided over a measuring roller in forming an obtuse angle between two deflection rollers limiting the measurement range. The force exerted on the measuring roller in doing so represents a measure for the strip tension. The measuring device permits also sensing a dissymmetry of the strip's tension if the forces caused by the strip's tension are sensed separately at the two ends of the measuring roller. By correspondingly careful construction and, in particular, by using uninterrupted sufficiently smooth surfaces, i.e., of rollers covering in each case the total width of the strip, markings on the surfaces caused by deflection rollers or measuring rollers can be avoided in cold strip.

The present invention starts out from the knowledge that, on one hand, sensing the strip tension is not sufficient in itself to avoid rupturing the strip on account of locally exaggerated strip tensions. It comprises, furthermore, the knowledge that measuring the local distribution of the longitudinal stresses of the strip over its cross section permits conclusions on the shape of the roll gap. If one starts on the presumption that a cold strip possessing constant thickness over its width is fed to a gap formed between a pair of work rolls, and after leaving the roll gap the areas rolled more heavily are also stretched more heavily, it follows that the tension within these areas is considerably less than in areas which have not been rolled that heavily. A measurement of the stress distribution would also be considerably more sensitive than the usual measurement of strip thickness since in this case a small change of the measured value represents a few percent decrease of the thickness for a considerable difference in the longitudinal stresses in the strip. The one-dimensional distribution of the tensile stresses over the width of the strip cannot be determined, however, with a single measuring roller which has been wrapped around by the cold strip in an angle of a few degrees since the roller essentially permits only the measurements at the two bearings which support it. Suggestions to use several strip tension meters in analogy to the application of some thickness measuring devices distributed over the width of the strip, which in principle are similar to the ones known, are objected to as being unsuccessful since in this case the rollers, the feeler levers, or the like would mar the surface at least in each case in the marginal areas of the strip.

According to the present invention, strip tension is measured in any chosen regions of the width by deflecting the strip in a known manner, for example, by a guide roller feasibly for limiting the measurement range over devices projecting magnetic fields so that the fields can induce forces directed perpendicular to the surface of the strip without contact with the surface of the strip taking place. Furthermore, there are transducers coordinated to the measuring device representing the values of measurement which respond, without touching the strip, to the deflection of the strip under the influence of the field and/ or to the field itself or values characterizing its projection. Since both the action of the force and the measurement are carried out without contacting the strip, it is possible to confine the action of the measuring device between the deflection rollers extending over the entire width of the strip to a predetermined region of the strip and, thus to determine tensile forces in partial regions and at the same time avoiding markings which decreases the accuracy of the value. By distributing several transducers crosswise to the lengthwise direction of the strip, measurements can be made which correspond to the stepwise distribution of the stress over the width of the strip. The fields themselves may be formed approximately constant over the width of the strip or they may, on the other hand, possess a characteristic of their own over the width of the strip which is taken into account in the finding and the evaluation, respectively, of the strip deformation or the field characteristics, respectively. Also, locally confined fields may be achieved in each case within the sphere of action of the transducers.

The devices for projecting the field can be provided with electromagnets which when connected to alternating or direct current can exert attracting forces or, when alternating current is used, especially of higher frequency, may result in a repulsion of the strip under the influence of eddy currents induced in it. Furthermore, it has proved successful to provide jets as the devices projecting a field which jets yield a liquid or a gaseous medium so that here, too, the action on the strip takes place without application or touching of solid objects.

For the determination of the location or the distance, respectively, of the strip inductively acting sensors have proved themselves whose self-induction, coupling factor, or the like changes as a function of the distance to the cold strip. The sensors may have the design of transducers which pass on the distance determined as a value functionally representing the strip tension. On the other hand it has proved favorable to have control devices follow the sensors which influence the devices, projecting fields and result in a constant deformation of the strip via them. In this case the readings of the strip stresses can be taken from the controlled system, or measurements or the manipulated variables of the field or the devices projecting the fields, respectively. Thus the suitable transducers can be coordinated to an actuator in the form of a follower, or can be designed as pressure gauges which measure pressures of the field or within the nozzle devices.

In the practical example it has proved to be purposeful to provide a plate between the deflection rollers underlying the strip, while maintaining a distance excluding direct contact, which holds the devices projecting the field as well as sensors supervising the deflection of the strip. However, devices have proved to be recommendable in which the plate is formed in sections arranged in a common plane which have devices projecting the field in each case and to which each section the reaction of or the transducer (itself) representing the built-up fields are assigned.

The underlying of the strip by a closed plate, in particular if the plate design is smooth and the height enclosed between the strip and the plate is low, favors building up a flow field which with a suitable design causes a deflection of the strip toward the plate. With greater relative height of the space confined by the plate and the strip, and in particular when border ledges are used which restrict the space toward the border or, if need be, with the formation of the border regions of the plate in addition, thus causing an eddy effect to the field, in a manner similar to a labyrinth seal, the build-up of a pressure field can be enhanced in which the forces acting on the strip or reacting on the plate, respectively, cause a repulsion of the strip. Beyond that, compressed air, or better yet, because of their greater mass, water or emulsion jets directed by nozzles can be used which likewise can project rebound fields causing repelling forces. In doing this it may prove purposeful to couple in each case also the transducer sensing the tensile stress mechanically with a jet or to connect, respectively, or to join them.

For evaluating the measurements it has proved to be advantageous to provide more than one transducer over equal widths of the strip in order to be able to perform in a relatively simple way absolute differential measurements by separate and thus de-coupled transducers.

It was found recommendable to equip the surface of the plates underlying the strip with an abrasion-proof layer of a synthetic.

In detail, the characteristics of the invention are explained by means of the following description of practical examples in conjunction with drawings representing them:

There are shown in

Figure 2:
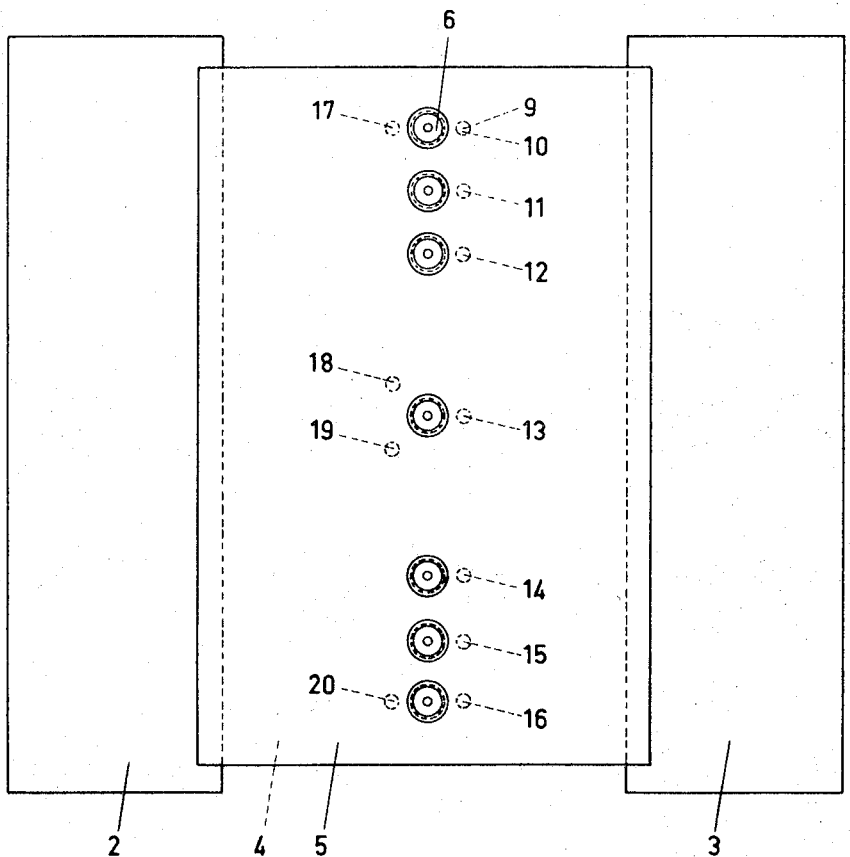
Figure 3:
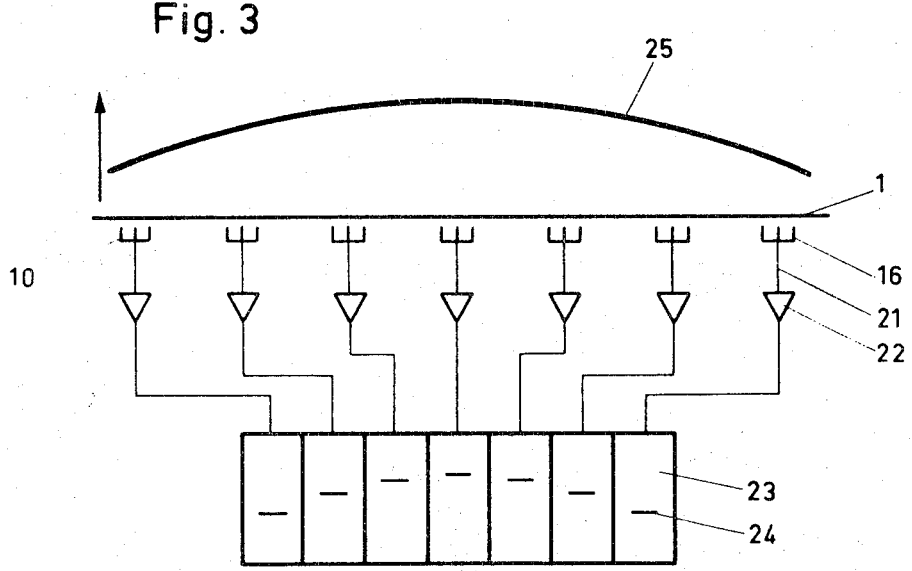
Figure 4:
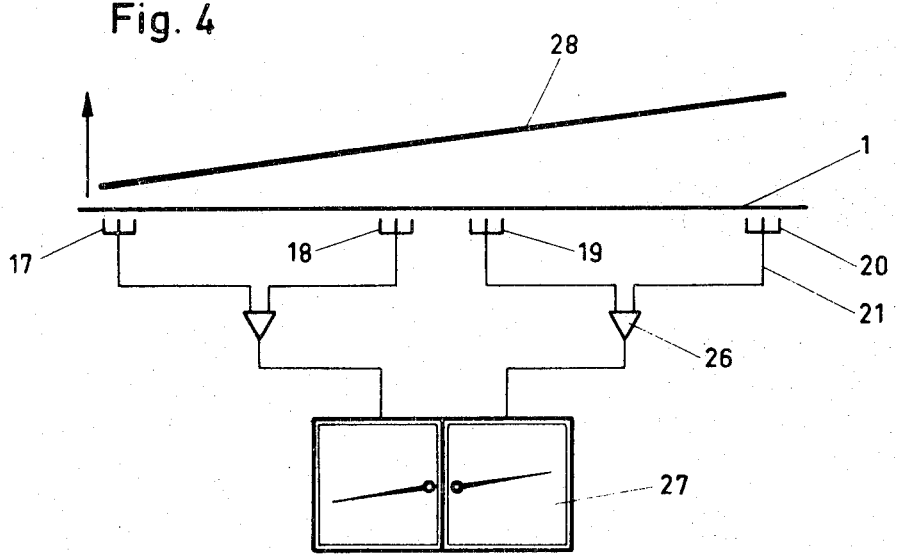
Figure 5:
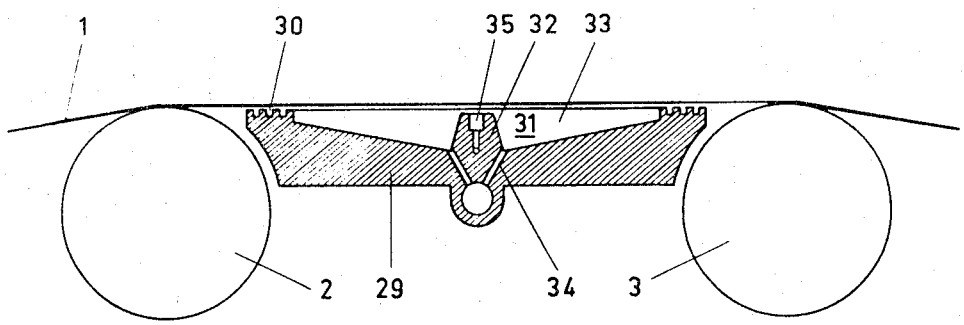
Figure 6:
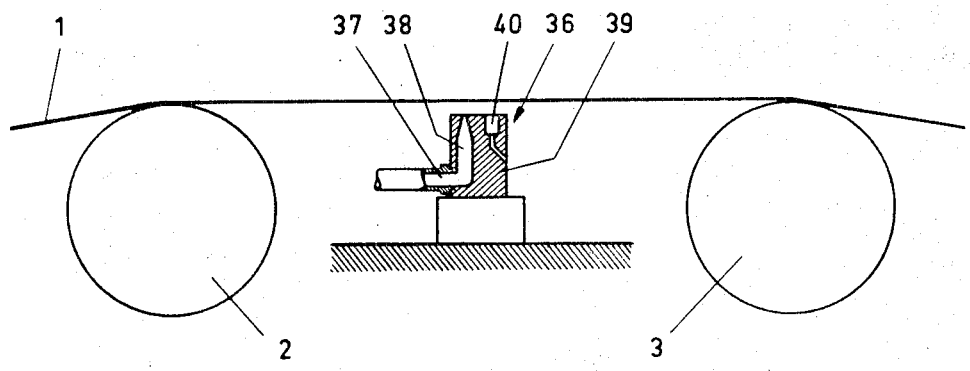
Figure 7:
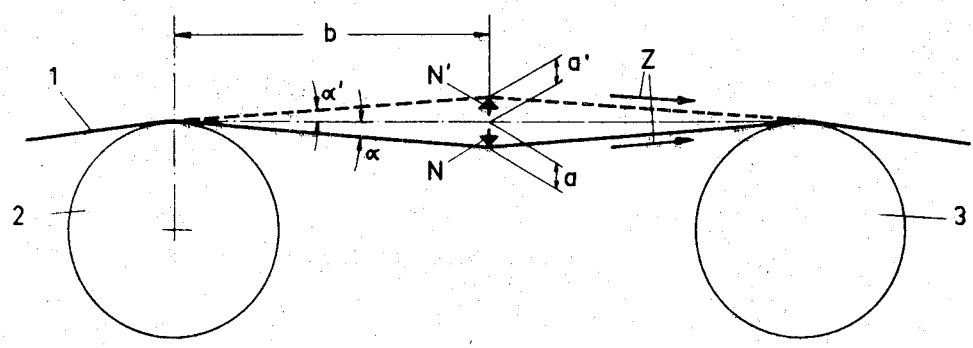
Figure 8:
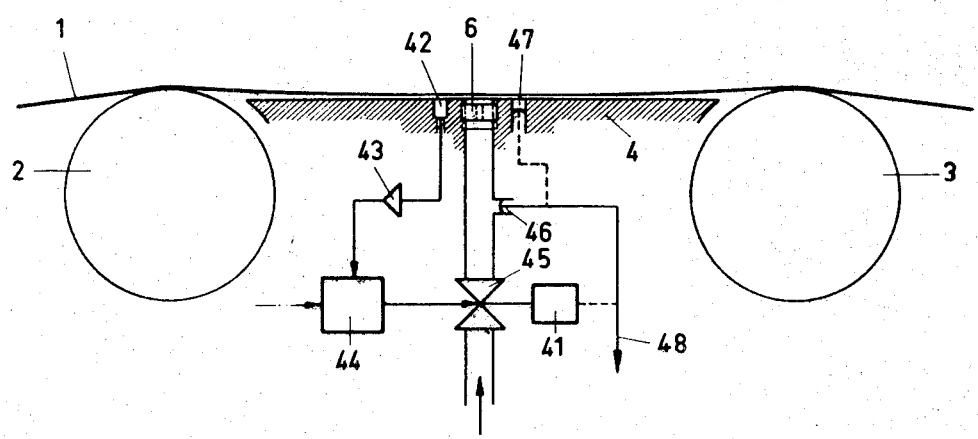
Figure 9:
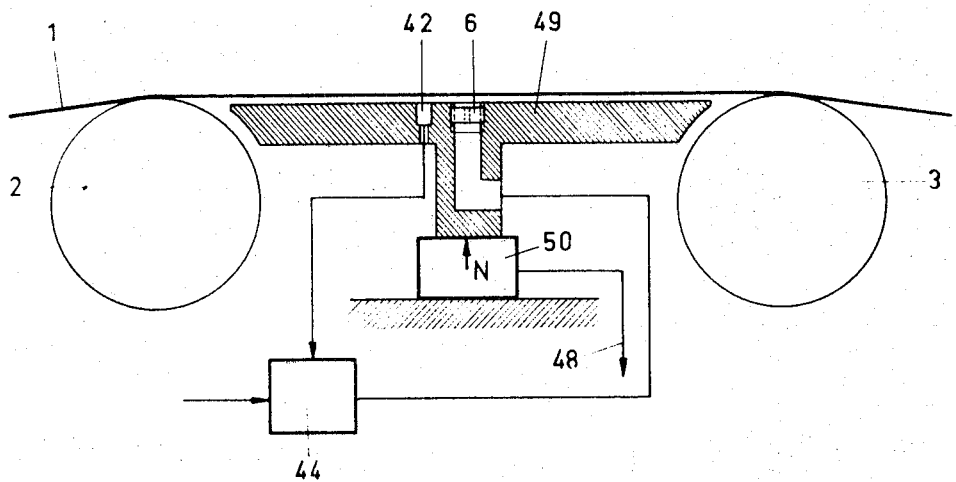
Figure 10:
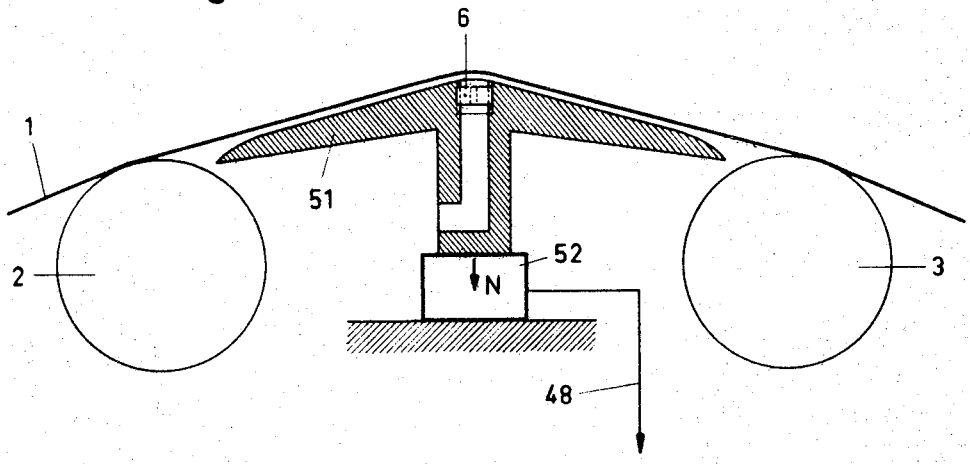

FIG. 1 a longitudinal section through a measuring device;

FIG. 2, a top view onto the device according to FIG. 1 after the strip has run off;

FIG. 3, in a block diagram an evaluating device indicating or transmitting absolute values, respectively, following the evaluating device, with a diagram illustrating the stresses in their distribution, as an example;

FIG. 4, a block diagram of an indicating and evaluating device registering the distribution of stresses over two partial regions, based on differential measurements with a stress diagram assumed as an example;

FIG. 5, a device deflecting the strip by a pressure field in which the evaluation is done by measuring the increase of the distance;

FIG. 6, a device of an isolated device causing rebound fields and possessing nozzles;

FIG. 7, a schematic drawing illustrating the condition of a deflected strip under the influence of external forces;

FIG. 8, a similar device in which the strip deflection is held constant by means of a control device, and measurement results can be taken from the field or the control system, respectively;

FIG. 9, a device, in principle similar to FIG. 8, in which the tensile stress is ascertained by determining the tensile force on individual plates distributed over the width of the strip; and FIG. 10, a device in which the strip is deflected by an amount essentially determined by the shape of the plates and in which the tensile force is ascertained by the determination of the reaction forces.

In FIG. 1 a cold strip 1 is shown which for the measurement of stresses is guided over deflection rollers 2 and 3. Between the deflection rollers a plate 4 is provided which, for avoiding surface damage of strip 1 in the case of contact, is coated with an abrasion-proof layer 5 of a synthetic. The plate 4 possesses a number of nozzles 6, distributed in the transversal direction of the trip, whose connections 7 empty into a main line 8 from which they are provided with compressed air. In additional drillings of the plate 4 inductive transducers 10 to 20, as shown in FIG. 2, are provided whose inductive resistance changes in relation to the thickness and, in particular, to the distance of the cold strip 1 and which are connected with subsequent evaluating devices via measurement lines 21.

The cold strip 1 is pulled over the deflection rollers 2 and 3 in such a manner that it hugs the periphery of these rollers at least a little and winds around these by at least a few angular degrees so that between the deflection rollers a measuring surface is formed, below which surface the plate 4 is provided at a distance which precludes direct contact. To carry out the measurement during the rolling or reeling procedure, respectively, the main line 8 is charged with compressed air which, emerging from the nozzles 6, escaping through the space enclosed between the plate 4 and the strip 1, expands and creates a flow field within this space. According to Bernoulli's theorem the pressure decreases with increasing velocity of the flow so that a vacuum becomes effective on the underside of the cold strip 1. Under the influence of these forces the cold strip is pulled down. Such a deflection is opposed by the stiffness of the strip, whose influence can be neglected for thin material, and in particular the longitudinal pull imparted to the strip between reel and stand or stand and reel, respectively, or even between stands, which has the tendency to tighten the strip in such a way that it represents a plane while being tangential to the generatrices of the deflection rollers 2 and 3. Under the influence of the third force directed toward the bottom an equilibrium occurs with which one may assume that the flow field does not change or only as a function of the deflection of the strip and with that of its contraction. As the tension of the strip changes. the individual deflection or the decrease of the distance between the cold strip 1 and the transducers can be taken as a measure for the tension of the strip. It has, furthermore, turned out that even with a homogenous flow field over the width of the strip the deflection within the individual regions is different. Then tensile forces occurring per region or the tensile stresses, respectively, are here not constant over the width of the strip and can be determined by an appropriate number of transducers 10 to 20 assigned to each individual region.

To achieve a homogenous flow field it may be advantageous to provide an uneven division of the nozzles 6 over the width of the strip. On the other hand, if need be, nozzles can be completely omitted. The supply of the flow medium, in this case, is done by slots which, e.g., extend over the total length of the strip, provided in the plate, feasibly are made expanding in their cross section in the manner of an exponential funnel toward their plane protruding through the surface of the plate.

On the other hand, it has turned out also that well plottable results of measurements are obtained also if fields are built up only in the vicinity of the transducers in each case so that, e.g., to each transducer or a group 10, 17 or 13, 18, 19, respectively, one nozzle 6 is coordinated. Since in the subsequent evaluation the sensitivities of the transducers can be equalized individually, thereby both positional differences and field differences occurring in the vicinity of the transducers can be equalized in the same manner as the conditions occurring at the borders of the strip in which, on account of the free edge unilaterally, the influence of neighboring regions is omitted.

As an example of the evaluation of the measuring results, FIG. 3 represents a block diagram of a device for an absolute measurement of stresses within a number of regions. The inductive transducers 10 to 16 of the practical example of FIGS. 1 and 2 are made as open pot cores whose self-induction essentially is a function of the distance of the cold strip. The inductive transducers are connected with amplifiers 22 via leads 21 for measuring while the transducers in each case are connected to the amplifiers as the fourth arm of a bridge, i.e., as supplements to a bridge. The third arm of the bridge is, feasibly, formed by an adjustable inductance (not shown in the drawings) with the aid of which equalizing can be achieved. With a temperature range matched to the transducers a far-reaching temperature compensation can be achieved when adequately located. The measuring bridge forced in such a manner can be balanced for adaptation to given operating conditions and can be adjusted in its sensitivity. The measurement results are obtained as unbalance of the equilibrium of the bridges and are fed to a rectifier contained in the amplifier or to a discriminator, respectively. Perhaps with the inclusion of a direct-current amplification stage, the outputs are fed to measuring instruments 23 which in the practical example are arranged next to each other shown as if equipped with a vertical scale so that the location of the pointers 24 simultaneously illustrates the characteristics 25 of the momentary voltage distribution over the bandwidth. Otherwise, or perhaps paralled the measurements can be fed to a control device which includes these as actual values in the control procedure.

In FIG. 4, also is a block diagram, and serves to illustrate an evaluation device for an increase or decrease of the strip tension, respectively, from the middle outward, and in conjunction with that a corresponding decrease or increase of the strip thickness based on a differential measurement. Here, too, the possibility exists to feed the results as actual values to a control device or a crown control, respectively or if the measurement location precedes the final control element as interference value. The inductive transducers 17 to 20 or the transducers of the same designation of the FIGS. 1 and 2, are via measurement lines 21, in each case in pairs, connected with the inputs of amplifiers 26, in which the inductive transducers, e.g., 17 and 18, are treated as two branches of a bridge fed with an alternating voltage of higher frequency which is supplemented within the amplifier by two additional resistors. In the output part the amplifiers possess discriminators 26 whose output signal voltage in its polarity is a function of the voltage measured at the bridge. In the block diagram, FIG. 4, these voltages are measured by means of measuring instruments which are designed as pointer instruments with the null indication in the center and are for use on a horizontal surface. By suitable polarity it is achieved that in this case, too, the momentary characteristic 28 of the individual distribution of the tensile stresses over the width of the strip is reproduced in an easily perceptible way. In all these cases it is possible to recognize deviations from the given optimal ordinate as well as dangerous approximations to the maximally permissible ordinate within certain confines and to localize the corresponding regions so that manually or by means of control technology remedial measures and a reversion to favorable values can be attained. By the combination of the practical examples it was shown simultaneously that, if need be, also absolute and difference measurements can be carried out next to each other. In this case, if on account of the measurement the common use of one provided sensor in the provided region of the width is not possible, several sensors are to be provided within the region of the width in a parallel arrangement so that a mutual influencing will be excluded.

Further arrangements for the construction of these devices making possible this measurement of strip tensions without contact are shown in FIGS. 5 and 6. In both instances the cold strip 1 is guided via deflection rollers 2 and 3 in such a way that the measurement range is clearly defined. In FIG. 5 there is a plate 29 confining the field toward the bottom and which is arranged between the deflection rollers 2 and 3 whose borders extend far into the spaces confined between the strip 1, on one hand, and the enveloping surfaces of the deflection rollers 2 and 3, on the other hand. The border strip facing strip 1 is designed as a labyrinth seal 30 by protrusions. In doing this it proves to be favorable that the deflection of the strip, on account of the pressure field to be built up has only little influence in the vicinity of the active surfaces of the deflection rollers, i.e., over the labyrinth seal, so that between the labyrinth seal 30 and the strip 1 the gap formed can be dimensioned narrowly and practically hardly changes. In the center, the plate 29 possesses a ridge 32 extending over the width of the strip whose surface reaches close below the strip 1. Between the ridge and the labyrinth seals comparatively deep cavities extend which thereby possess a great cross section which are provided with compressed air via the air access channels 34. In the lengthwise direction of the strip, at least toward the back and the front, the chambers 31 are closed by longitudinal walls 33 or subdivided into longitudinal regions by additional walls, respectively, in such a way that the air can only escape from the chambers 31 by heavily impeding at the side edges of the strip. The air supply channels 34 are, therefore, in a position to maintain a relatively high pressure of the supplied medium within the chambers 31, without pressure drops occurring within the chamber by the high velocities of the current. The depressurizing of the air selected as medium takes place only when leaving the chamber and high current velocities here, too, are prevented by shaping the surfaces in the manner of a labyrinth, with the aid of creating eddies. The pressure field forming within the strip 1 endeavors to deflect the strip away from the ridge 32 and thus to increase the distance. Here, too, there exists a local equilibria between the longitudinal tension of the strip and the normal pressure over the width of the strip, in which the local deflection is measured by means of inductive transducers 35 arranged in the ridge 32. The evaluation of the signals received from the inductive transducers can be performed as explained in connection with FIGS. 1 to 4.

FIG. 6 shows an example of a number of devices distributed over the width of the strip which act on the strip 1 laid around the deflection rollers 2 and 3, which are mounted in a relatively isolated way and which possess nozzles 38 fed by supply systems 37. The jet emitted by the nozzles 38 impinges on the cold strip 1 and deflects it in the direction of the built-up impingement field as a function of the latter's size and direction as well as of the amount of the longitudinal tension of the strip. Simultaneously, the nozzle experiences thereby a reacting force. Connected with the nozzle to form an arrangement 36 is a holder 39 for an inductive transducer 40 which can send electrical signals corresponding to the distance to the cold strip to an indicator or a control device, respectively.

FIG. 7 illustrates the conditions prevailing in the deflection in which a strip 1 guided over deflection rollers 2 and 3 is shown schematically which is deflected by the action of perpendicular forces N or N', respectively, by the amounts $a$ or $a'$, respectively. For simplification, it is assumed herein that the perpendicular forces are applied in a line lying transversely to the lengthwise direction of the strip, i.e., in FIG. 7 within a point. Thus, the equation results for the deflection $$N = 2Z = \sin \alpha$$

wherein Z equals the tension and which equation can be approximated as:

$$N = 2Z \frac{a}{b}$$

In the practical examples described so far the deflection $$a = \frac{Nb}{2Z}$$

is used to depict the partial tension or the stresses at each of the measurement locations distributed over the width of the strip, a value, which is in an inverse proportion to the partial tension. The adjustment of the measuring device to the operation values, e.g., different total tensions with different strip thicknesses, can be attained by varying the perpendicular force N, e.g., by varying the air pressure and/or by appropriately upsetting the balance of the bridge in the evaluating devices following the transducers. Suitably, adjusting elements required for regulation are coupled with the existing strip tension adjustment. In some cases it has turned out as a disadvantage that with greater deviations of the partial strip tensions from the total tension, or the partial strip stresses from the means strip stress, respectively, the non-linear function of deflection "$a$" and strip tension Z shows up in a disturbing way. Therefore, according to the invention, it is proposed to adjust the strip deflection as caused under the influence of the field to a constant value so that the perpendicular force N caused by the field becomes proportional to the strip tension and can be taken as its analogue. The purpose of the control device used, therefore, serves to compensate for changes of the tension by adjustments of the perpendicular force proportional to them.

A measuring device working according to this method of measurement is shown in FIG. 8. The construction of the measuring device is similar to that depicted in FIGS. 1 and 2. In addition, each of the measurement locations is equipped with a delay control device which following the inductive transducer 42 possesses a carrier-frequency amplifier 43 as well as a control amplifier 44 which, based on the difference between the set value and the actual value of the signals fed to it yields an adjustment value and acts on the air adjustment valve 45 coordinated to it. By adjusting the air control valve 45 a field is projected with the aid of the air leaving the nozzle 6, whose perpendicular forces exerted on the strip 1 hold this at the given distance. If the distance "$a$" of the strip 1 from the plate 4 differs, the control amplifier 44 causes a further adjustment of the air control valve 45 which diminishes this difference against the value 0. In FIG. 8 three possibilities are shown in parallel to transmit to the measuring line 8 measured values proportional to the strip tensions or the strip stresses, respectively. The pressure sensor 46 permits the determination of the pressure existing in the device projecting the field, which, as tests show, is approximately proportional to the perpendicular force induced to the strip. There is, moreover, the possibility to provide a pressure sensor 47 as signal transmitter which is provided in the sphere of influence of the field itself and serves as pressure pickup. As a third possibility of the use of a signal transmitter a servo 41 is shown which is adjusted together with the air control valve 45 and thus is energized by the control amplifier 44. The measurement locations distributed on the measuring lines 48 over the transversal direction of the strip 1 can be evaluated in analogy to the practical examples shown in FIGS. 3 or 4. Although the measuring device itself is more expensive than one for simple measurments of distances, the extended proportionality affords an absolute strip tension measurement over greater ranges, which can be realized in a relatively simple manner, as well as the control of appropriate control device which react on the adjustment of the rolls.

The possibility of measuring the effect of the field is not confined to measurements of air pressure, as FIG. 9 shows, but besides the pressure, the velocity of the flow, or the like, or the reaction force exerted by the field can also be used. In FIG. 9, a measuring device is shown in a representation comparable to FIGS. 1 and 8 in which the strip 1, guided over the deflection rollers 2 and 3 is carried in the measurement region over a number of plates 49 lying next to each other, and which in each case underlies a region of the width of the strip 1, which are held individually on force-measuring capsules 50 which determine the reaction force. Here, too, control devices 44 are provided, following the transducers 42, which effect a constant definitive deflection of the strip 1 so that the force-measuring capsule 50 provided as signal transmitter can supply signals proportional to the tension of the strip over the measuring line 48, as a function of the transmitted reaction force, onto the perpendicular forces induced between the strip 1, on one hand, and the plate 49 on the other hand.

Another variation of such devices is shown in FIG. 10. This device also supplies signals proportional to the strip tension via the measurement line 48, since one operates with an essentially constant deflection. The deflection, however, is not held constant by a control device. Measuring plates 51 are used whose upper surfaces are arranged in the shape of a roof including an obtuse angle and which effect a corresponding deflection of the strip 1 due to their shape. The deflection is hereinchosen to great that minor variations of the contact distance are of an order which is smaller than the deflection "$a$" of the strip, and, therefore, can be neglected. The arrangement of the upper surfaces as well as the arrangement and the pressure of the nozzle 6 are chosen in such a way that the strip 1 is completely lifted off the upper surfaces of the plates 51 and is held at a small distance over them so that in any case, while the strip is moving contact with the attempted marking and cutting on the plates 51 is avoided. The reaction force exerted by the strip is determined with the aid of a force-measuring capsule 52, provided as signal transmitter, whose output signals go into the measuring line 48.

As with the other practical examples, here, too, it proves practical to cover the surfaces of the plates 51 with a thin layer of a synthetic material. In any event by the distribution of a suitable number of measuring devices over the width of the strip, measuring devices are created which make it possible to determine the distribution of the longitudinal tension over the width of the strip so that either the status of the mill rolls is thus indicated in a manner that a correction of the setting of the stand is possible, for a control device correcting the setting can be controlled directly without the need of employing expensive thickness measuring devices which work by radiation, or the danger existing to adversely influence the quality of the sheet by damage to the surface.

In accordance with the provisions of the patent statutes, we have explained the principle and operation of our invention and have illustrated and described what we consider to represent the best embodiment thereof. However, we desire to have it understood that within the scope of the appended claims, the invention may be practiced otherwise than as specifically illustrated and described.

We claim:

1. In combination with two strip supporting means arranged to confine a moving cold metallic strip to a predetermined path of travel, which strip is subject to differential tensile forces across its width, a device for determining the different amplitudes of deflections of the strip at varying points across its width which different amplitudes are a function of said tensile forces at said points, said device being located between said supporting means and spaced on one side of the strip so as not to contact the strip, said device comprising a source of gaseous medium fed under pressure against said strip, said gaseous medium creating a substantially uniform force acting across the strip to deflect said strip relative to said path of travel, a number of inductive devices located adjacent to said strip and having a self inductance directly dependent on the location of said strip, and means to measure, and produce a representation of self inductance as an indication of the tensile forces in said strip.

2. In a device for determining the different amplitudes of deflections of a strip according to claim 1 including a plate being arranged between said supporting means and underlying the strip, said plate being arranged at a distance from the strip so as not to be contacted by the strip and carrying said source of gaseous medium and said inductive devices.

3. In a device for determining the different amplitudes of deflections of a strip according to claim 1, including means for establishing a pressurized field between said strip and said plate and consisting of sealing members that extend in a direction parallel to the strip.

4. In a device for determining the different amplitudes of deflections of a strip according to claim 1, including an abrasive-proof layer of synthetic material covering the surface of the plate most adjacent to the strip.

5. In a device for determining the different amplitudes of deflections of a strip according to claim 1, wherein said inductive devices each comprise a single electrical inductive unit being arranged on the same side of said strip on which the gaseous medium is acting.

6. In a device for determining the different amplitudes of deflections of a strip according to claim 1, wherein the sources of gaseous medium are nozzles having orifices for directing the medium against the strip.

7. In a device for determining the different amplitudes of deflections of a strip according to claim 1, including a plate carrying said sources of gaseous medium and said inductive devices, said plate being arranged between said supporting means and the underlying strip, and at a distance from the strip so as not to be contacted by the strip.

8. In a device according to claim 1 wherein said signal transmitters, each comprising a single force measuring unit for measuring the reaction forces of the gaseous medium against the strip.

References Cited

UNITED STATES PATENTS

| | | | |
|---|---|---|---|
| 3,394,587 | 7/1968 | Freeman | 73—143 |
| 3,311,818 | 3/1967 | Quittner | 324—34 |
| 3,201,985 | 8/1965 | Williams | 73—143 |
| 2,755,032 | 7/1956 | Justus | 242—75 |
| 2,728,223 | 12/1955 | Herrman | 73—144 |
| 2,674,127 | 4/1954 | Garrett | 73—159 |
| 2,370,845 | 4/1945 | Davis | 175—183 |
| 2,100,653 | 11/1937 | Umansky | 72—9 |
| 2,444,245 | 6/1948 | Campbell | 73—144 |

FOREIGN PATENTS

| | | |
|---|---|---|
| 1,055,349 | 4/1959 | Germany. |
| 158,036 | 3/1957 | Sweden. |
| 1,052,989 | 12/1966 | Great Britain. |

RICHARD C. QUEISSER, Primary Examiner

J. WHALEN, Assistant Examiner